United States Patent
Ferguson et al.

(10) Patent No.: US 8,504,233 B1
(45) Date of Patent: Aug. 6, 2013

(54) SAFELY NAVIGATING ON ROADS THROUGH MAINTAINING SAFE DISTANCE FROM OTHER VEHICLES

(75) Inventors: David I. Ferguson, San Francisco, CA (US); Dmitri Dolgov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/457,628

(22) Filed: Apr. 27, 2012

(51) Int. Cl.
*G01C 22/00* (2006.01)
*G06K 9/00* (2006.01)
*B60Q 1/26* (2006.01)

(52) U.S. Cl.
USPC ............... 701/23; 382/103; 340/463

(58) Field of Classification Search
USPC ............................. 701/23; 340/463
See application file for complete search history.

(56) References Cited

U.S. PATENT DOCUMENTS

| | | | | |
|---|---|---|---|---|
| 5,572,449 A * | 11/1996 | Tang et al. | | 700/304 |
| 6,292,752 B1 * | 9/2001 | Franke et al. | | 701/300 |
| 6,639,521 B2 * | 10/2003 | Hilliard et al. | | 340/941 |
| 6,675,094 B2 * | 1/2004 | Russell et al. | | 701/301 |
| 7,400,236 B2 * | 7/2008 | Kade et al. | | 340/463 |
| 7,634,339 B2 | 12/2009 | Kudo | | |
| 7,783,403 B2 * | 8/2010 | Breed | | 701/45 |
| 7,890,231 B2 * | 2/2011 | Saito et al. | | 701/41 |
| 7,979,172 B2 * | 7/2011 | Breed | | 701/23 |
| 2008/0147253 A1 * | 6/2008 | Breed | | 701/3 |
| 2010/0098295 A1 * | 4/2010 | Zhang et al. | | 382/103 |
| 2010/0246889 A1 | 9/2010 | Nara et al. | | |
| 2011/0118900 A1 | 5/2011 | Uchida et al. | | |
| 2011/0190972 A1 | 8/2011 | Timmons et al. | | |
| 2012/0330528 A1 * | 12/2012 | Schwindt et al. | | 701/96 |

* cited by examiner

*Primary Examiner* — Thomas Black
*Assistant Examiner* — Tyler Paige
(74) *Attorney, Agent, or Firm* — McDonnell Boehnen Hulbert & Berghoff LLP

(57) ABSTRACT

Methods and devices for controlling a vehicle in an autonomous mode are disclosed. In one aspect, an example method is disclosed that includes obtaining, by a computer system, lane information that provides an estimated location of a lane of a road on which a vehicle is traveling, where the computer system is configured to control the vehicle in an autonomous mode. The example method further includes determining, by the computer system, that the lane information has become unavailable or unreliable and, in response to determining that the lane information has become unavailable or unreliable, the computer system using at least one sensor to monitor at least one neighboring vehicle and controlling the vehicle to maintain a distance between the vehicle and the at least one neighboring vehicle to be at least a predetermined minimum distance.

20 Claims, 11 Drawing Sheets

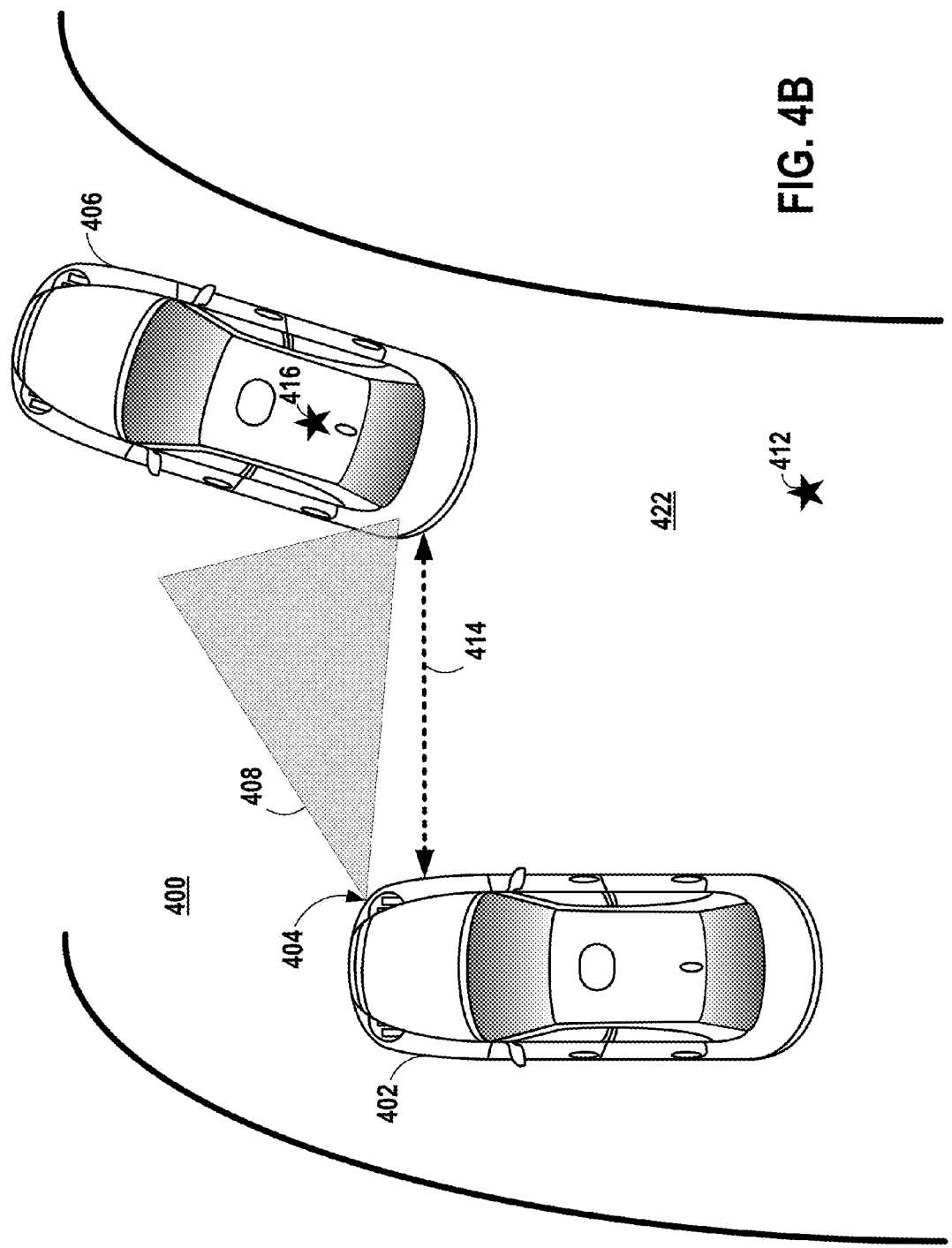

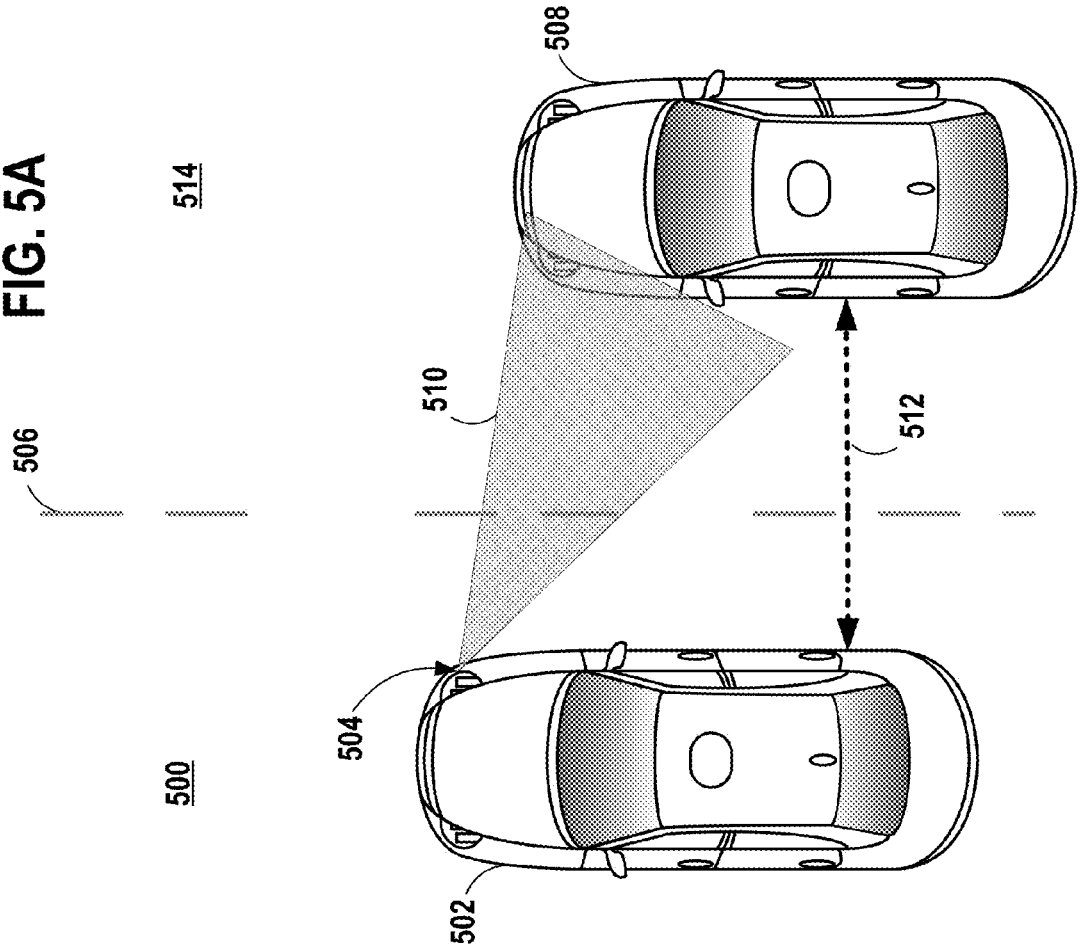

US 8,504,233 B1

SAFELY NAVIGATING ON ROADS THROUGH MAINTAINING SAFE DISTANCE FROM OTHER VEHICLES

BACKGROUND

Some vehicles are configured to operate in an autonomous mode in which the vehicle navigates through an environment with little or no input from a driver. Such a vehicle typically includes one or more sensors that are configured to sense information about the environment. The vehicle may use the sensed information to navigate through the environment. For example, if the sensors sense that the vehicle is approaching an obstacle, the vehicle may navigate around the obstacle.

SUMMARY

In one aspect, an example method is disclosed that includes obtaining, by a computer system, lane information that provides an estimated location of a lane of a road on which a vehicle is traveling, where the computer system is configured to control the vehicle in an autonomous mode. The example method further includes determining, by the computer system, that the lane information has become unavailable or unreliable and, in response to determining that the lane information has become unavailable or unreliable, the computer system using at least one sensor to monitor at least one neighboring vehicle and controlling the vehicle to maintain a distance between the vehicle and the at least one neighboring vehicle to be at least a predetermined minimum distance.

In another aspect, a non-transitory computer-readable medium is disclosed having stored therein instructions executable by a computing device to cause the computing device to perform the example method described above.

In yet another aspect, an example vehicle is disclosed that includes at least one sensor, at least one processor, and data storage comprising a predetermined minimum distance and instructions. The instructions are executable by the at least one processor to obtain lane information that provides an estimated location of a lane of a road on which the vehicle is traveling, determine that the lane information has become unavailable or unreliable and, in response to determining that the lane information has become unavailable or unreliable, use the at least one sensor to monitor at least one neighboring vehicle, and control the vehicle to maintain a distance between the vehicle and the at least one neighboring vehicle to be at least a predetermined minimum distance.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 4A-C illustrate an example implementation of the example method, in accordance with an embodiment.

FIGS. 5A-B illustrate an example implementation of the example method, in accordance with an embodiment.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

A vehicle may include a computer system that is configured to control the vehicle in an autonomous mode. To this end, the computer system may be configured to obtain lane information that provides an estimated location of a lane of a road on which the vehicle is traveling. The lane information may be based on, for example, lane markings on the road, a geographic location of the vehicle, and/or a predetermined map of the road. Other types of lane information are possible as well.

At some point, the vehicle may determine that the lane information has become unavailable or unreliable. For example, the vehicle may no longer be able to detect the lane markings on the road, the vehicle may detect contradictory lane markings on the road, the vehicle may no longer be able to determine a geographic location of the vehicle, and/or the vehicle may not be able to access a predetermined map of the road. Other examples are possible as well.

In response to determining that the lane information has become unavailable or unreliable, the computer system may use at least one sensor to monitor at least one neighboring vehicle, such as a neighboring vehicle in a neighboring lane or a neighboring vehicle behind the vehicle. The computer system may then control the vehicle to maintain a distance between the vehicle and the at least one neighboring vehicle to be at least a predetermined minimum distance.

In this manner, even if the vehicle is unable to rely on the lane information to estimate a location of the lane on the road, the vehicle may avoid colliding with the at least one neighboring vehicle.

Figure 1:
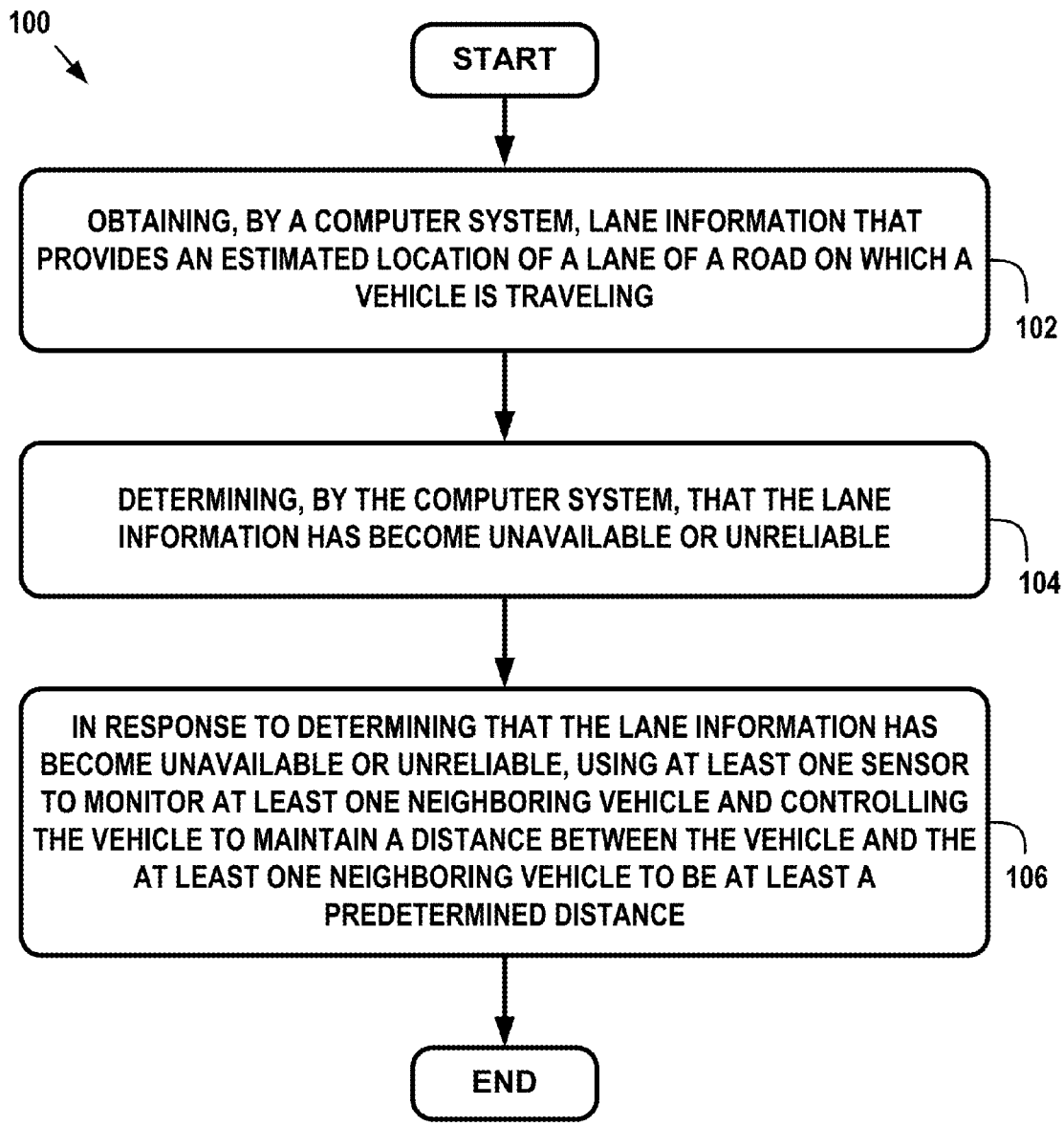
FIG. 1 is a flow chart illustrating an example method, in accordance with an embodiment.

FIG. 1 is a flow chart illustrating an example method 100, in accordance with an embodiment.

Method 100 shown in FIG. 1 presents an embodiment of a method that, for example, could be used with the vehicles described herein. Method 100 may include one or more operations, functions, or actions as illustrated by one or more of blocks 102-106. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, such as, for example, a storage device including a disk or hard drive. The computer-readable medium may include a non-transitory computer-readable medium, for example, such as computer-readable media that store data for short periods of time like register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 100 and other processes and methods disclosed herein, each block may represent circuitry that is configured to perform the specific logical functions in the process.

The method 100 begins at block 102 where a computer system configured to control a vehicle in an autonomous mode obtains lane information that provides an estimated location of a lane of a road on which the vehicle is traveling. The lane information may take a number of forms.

In some embodiments, the lane information may include lane markings on the road, and the computer system may use one or more sensors to sense the lane markings For example, the computer system may use an image-capture device to capture images of the road and may detect the lane markings by analyzing the images for predetermined colors, shapes, and/or brightnesses that are similar to a predetermined color, shape, and/or brightness of the lane markings. As another example, the computer system may project a laser onto the road and may detect the lane markings by analyzing reflections off the road for an intensity that is similar to a predetermined intensity of a reflection off the lane markings. Other examples are possible as well. In any case, once the computer system has sensed the lane markings, the computer system may estimate the location of the lane based on the sensed lane markings.

In other embodiments, the lane information may include a geographic location of the vehicle and a predetermined map of the road. The computer system may determine the geographic location of the vehicle by, for example, querying a location server for the geographic location of the vehicle. Alternatively, if the predetermined map indicates a geographic location of at least two objects near the vehicle, the computer system may determine the geographic location of the vehicle by, for example, using a laser rangefinder or light detection and ranging (LIDAR) unit to estimate a distance from the vehicle to the at least two objects near the vehicle and determining the geographic location of the vehicle using triangulation. Other examples are possible as well. In any case, the computer system may then locate the geographic location of the vehicle on the predetermined map to determine a location of the lane relative to the geographic location of the vehicle.

In still other embodiments, the lane information may include a leading vehicle that is in front of the vehicle in the lane. The computer system may estimate a path of the leading vehicle using, for example, a laser rangefinder and/or a LIDAR unit. Other examples are possible as well. Once the computer system has estimated the path of the leading vehicle, the computer system may estimate the location of the lane based on the estimated path. For example, the computer system may estimate the location of the lane to include the estimated path (e.g., extend by half of a predetermined lane width on either side of the estimated path). Other examples are possible as well.

The lane information may take other forms as well.

At block 104, the computer system may determine that the lane information has become unavailable or unreliable. For example, in embodiments where the lane information includes lane markings, the computer system may determine that the lane information has become unavailable or unreliable when no lane markings are present or are difficult to sense (e.g., because the lane markings have worn off or been removed due to construction) and/or when contradictory lane markings are present (e.g., because the lane markings have been repainted due to construction). As another example, in embodiments where the lane information includes a geographic location of the vehicle, the computer system may determine that the lane information has become unavailable or unreliable when the computer system is unable to communicate with a location server. As still another example, in embodiments where the lane information includes a predetermined map of the road, the computer system may determine that the lane information has become unavailable or unreliable when the no map of the road is available, or when only an incomplete map of the road is available. As still another example, in embodiments where the lane information includes a leading vehicle, the computer system may determine that the lane information has become unavailable or unreliable when the leading vehicle becomes too far away or has an inestimable path (e.g., because the leading vehicle is changing lanes, swerving, etc.). Other examples are possible as well.

In some embodiments, the computer system may maintain a predetermined threshold for the lane information, and the computer system may determine that the lane information has become unavailable or unreliable when the computer system detects that a confidence of the lane information (e.g., how confident the computer system is that the lane information is reliable) is below the predetermined threshold. In some embodiments, the computer system may additionally maintain a predetermined time period for the lane information, and the computer system may determine that the lane information has become unavailable or unreliable when the computer system detects that a confidence of the lane information is below the predetermined threshold for at least the predetermined amount of time.

At block 106, in response to determining that the lane information has become unavailable or unreliable, the computer system may use at least one sensor to monitor at least one neighboring vehicle. The at least one neighboring vehicle may include, for example, a neighboring vehicle in a lane adjacent to the lane in which the vehicle is traveling. As another example, the at least one neighboring vehicle may include a neighboring vehicle behind the vehicle in the lane in which the vehicle is traveling. As still another example, the at least one neighboring vehicle may include a first neighboring vehicle and a second neighboring vehicle, each of which may be either in a lane adjacent to the lane in which the vehicle is traveling or behind the vehicle in the lane in which the vehicle is traveling. Other examples are possible as well.

At block 106, further in response to determining that the lane information has become unavailable or unreliable, the computer system may control the vehicle to maintain a distance between the vehicle and the at least one neighboring vehicle to be at least a predetermined distance. The predetermined distance may be, for example, a distance determined to be a safe distance and/or a distance approximately equal to the difference between a predetermined lane width and a width of the vehicle. Other predetermined distances are possible as well.

In order to maintain the distance between the vehicle and the at least one neighboring vehicle to be at least the predetermined distance, the computer system may continuously or periodically use the at least one sensor on the vehicle to monitor the distance between the vehicle and the at least one neighboring vehicle. The computer system may monitor the distance between the vehicle and the at least one neighboring vehicle using, for example, a laser rangefinder and/or LIDAR unit. If the distance between the vehicle and the at least one neighboring vehicle becomes less than the predetermined distance, the computer system may move the vehicle away from the at least one neighboring vehicle in order to maintain the distance between the vehicle and the at least one neighboring vehicle to be at least the predetermined distance.

In some embodiments, in addition to maintaining the distance between the vehicle and the at least one neighboring vehicle to be at least the predetermined distance, the computer system may additionally maintain the distance between the vehicle and the at least one neighboring vehicle to be within a predetermined range of the predetermined distance. In these embodiments, if the distance between the vehicle and the at least one neighboring vehicle becomes too large (e.g., no longer within the predetermined range of the predetermined distance), the computer system may move the vehicle closer to the at least one neighboring vehicle. This may, for example, prevent the vehicle from drifting so far away from the neighboring vehicle that the vehicle drifts into a lane on the opposite side of the vehicle from the neighboring vehicle.

As noted above, in some embodiments the at least one vehicle may include a first neighboring vehicle and a second neighboring vehicle. In these embodiments, maintaining the distance between the vehicle and the at least one neighboring vehicle may involve maximizing both a first distance between the vehicle and the first neighboring vehicle and a second distance between the vehicle and the second neighboring vehicle (e.g., such that the vehicle remains approximately in the middle between the first neighboring vehicle and the second neighboring vehicle). Each of the first distance and the second distance may be at least the predetermined distance.

In some embodiments, in addition to maintaining the distance between the vehicle and the at least one neighboring vehicle to be at least the predetermined distance, the computer system may determine an updated estimated location of the lane. To this end, the computer system may use the at least one sensor to monitor at least a first distance to the at least one neighboring vehicle and a second distance to the at least one vehicle. Based on the first distance and the second distance, the computer system may determine a first relative position and a second relative position (e.g., relative to the vehicle) of the at least one neighboring vehicle. Based on the first relative position and the second relative position, the computer system may estimate a path for the at least one neighboring vehicle. The computer system may then use the estimated path to determine an updated estimated location of the lane. For example, in embodiments where the at least one neighboring vehicle is traveling in a lane adjacent to the lane in which the vehicle is traveling, the computer system may determine the estimated location of the lane to be substantially parallel to the estimated path (e.g., the lane may be centered on a path that is shifted from the estimated path by, e.g., a predetermined lane width and may extend by half of the predetermined lane width on either side of the path). As another example, in embodiments where the at least one neighboring vehicle is traveling behind the vehicle in the lane in which the vehicle is traveling, the computer system may determine the estimated location of the lane to be an extrapolation (e.g., with constant curvature) of the estimated path. Other examples are possible as well.

In some embodiments, the computer system may additionally use a speed sensor to monitor a speed of the at least one neighboring vehicle and may modify a speed of the vehicle to be less than the speed of the at least one neighboring vehicle. This may allow the vehicle to be passed by the at least one neighboring vehicle. Once the at least one neighboring vehicle has passed the vehicle, the at least one neighboring vehicle may become a leading vehicle, either in a lane adjacent to the lane in which the vehicle is traveling or a leading vehicle that is in front of the vehicle in the lane in which the vehicle is traveling, and the computer system may estimate the location of the lane of the road based on an estimated path of the leading vehicle, as described above.

In some embodiments, the computer system may begin to monitor the at least one neighboring vehicle only in response to determining that the lane information has become unavailable or unreliable. In these embodiments, prior to determining that the lane information has become unavailable or unreliable, the computer system may rely solely on the lane information to estimate the location of the lane. In other embodiments, however, the computer system may also monitor the at least one neighboring vehicle prior to determining that the lane information has become unavailable or unreliable. In these embodiments, the computer system may additionally use the distance to the at least one neighboring vehicle to estimate the location of the lane in which the vehicle is traveling. For example, if the at least one neighboring vehicle is traveling in a lane adjacent to the lane in which the vehicle is traveling, the computer system may determine that the lane does not extend to the at least one neighboring vehicle. As another example, if the at least one neighboring vehicle is traveling behind the vehicle in the lane in which the vehicle is traveling, the computer system may determine that the lane includes the at least one neighboring vehicle. Other examples are possible as well. Alternatively, in these embodiments, prior to determining that the lane information has become unavailable or unreliable, the computer system may simply use the distance to the at least one neighboring vehicle to avoid collisions with the at least one neighboring vehicle.

Further, in some embodiments, once the vehicle begins to monitor the at least one neighboring vehicle, the computer system may stop using the lane information to estimate the location of the lane in which the vehicle is traveling. In these embodiments, the computer system may rely solely on the distance to the at least one neighboring vehicle to avoid collisions with the at least one neighboring vehicle until the lane information becomes available or reliable. For example, the computer system may periodically attempt to obtain updated lane information. Once the computer system determines that the lane information has become available or reliable, the lane information has become available or reliable, the computer system may once again rely on the updated estimated location of the lane and less (or not at all) on the distance to the at least one neighboring vehicle. The computer system may determine that the updated lane information is reliable when, for example, the computer system determines that a confidence of the updated lane information is greater than a predetermined threshold. The predetermined threshold may be the same as or different than the predetermined threshold described above.

In other embodiments, however (e.g., those in which the lane information is available but unreliable), once the vehicle begins to monitor the at least one neighboring vehicle, the computer system may continue using the lane information to estimate the location of the lane in which the vehicle is traveling, but may rely less on the estimated location of the lane and more on the distance to the at least one neighboring vehicle to avoid collisions with the at least one neighboring vehicle. As with the embodiments described above, the computer system may periodically attempt to obtain updated lane information. Once the computer system determines that the lane information has become available or reliable, the computer system may once again rely more (or solely) on the updated estimated location of the lane and less (or not at all) on the distance to the at least one neighboring vehicle.

For purposes of illustration, a number of example implementations of the method 100 are described below in connection with FIGS. 2-5B. It is to be understood, however, that the example implementations are illustrative only and are not meant to limiting. Other example implementations are possible as well.

Figure 2:
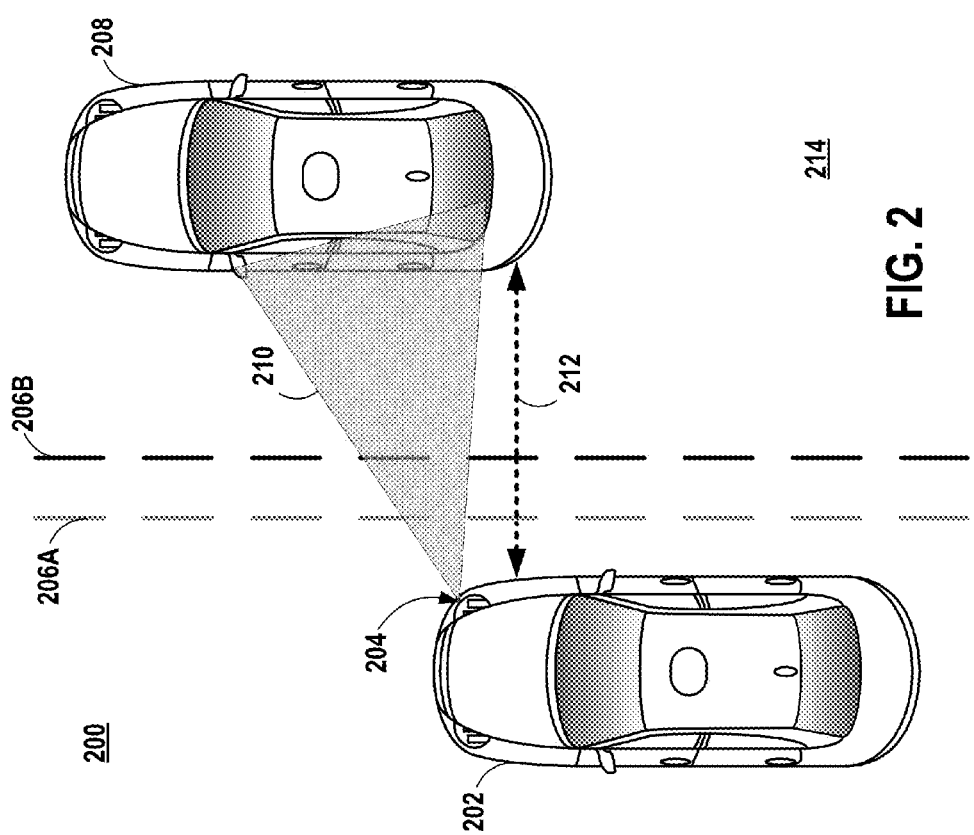
FIG. 2 illustrates an example implementation of the example method, in accordance with an embodiment.

FIG. 2 illustrates an example implementation of the example method, in accordance with an embodiment. As shown in FIG. 2, a vehicle 202 is traveling in a lane 200 on a road. The vehicle 202 includes a computer system (not shown) that is configured to control the vehicle in an autonomous mode. To this end, the vehicle 202 may use lane information, such as lane markings, to estimate a location of the lane 200 on the road.

As shown, the vehicle 202 includes a sensor 204. The sensor 204 may include, for example, an image-capture device, a laser rangefinder, and/or a LIDAR unit. Other sensors are possible as well. The vehicle 202 may use the sensor 204 to obtain lane information about the lane 200. For example, the vehicle 202 may use the sensor 204 to sense lane markings on the road, as described above.

At some point, the lane information may become unreliable. For example, as shown, the lane markings 206A, 206B are contradictory. This may be the result of, for example, construction, which has caused a change in the location of the lane 200. Due to the contradictory lane markings 206A, 206B, the vehicle 202 may have lowered confidence in the lane information and, accordingly, may determine that the lane information has become unreliable.

In response to determining that the lane information has become unreliable, the vehicle 202 may use the sensor 204 (or, in some embodiments, another sensor (not shown)) to monitor, as shown by the shaded triangle 210, a neighboring vehicle 208 that is driving in an adjacent lane 214. In particular, the vehicle 202 may monitor a distance 212 between the vehicle 202 and the neighboring vehicle 208 in order to maintain the distance 212 to be at least a predetermined distance. To this end, when the distance 212 falls below the predetermined distance, the vehicle 202 may move away from the neighboring vehicle 208 until the distance 212 is once again greater than the predetermined distance.

While the vehicle 202 is monitoring the distance 212, the vehicle 202 may periodically receive updated lane information. At some point, the vehicle 202 may determine that the updated lane information is reliable. For example, ahead on the road the lane markings 206A, 206B may merge, such that the lane markings are no longer contradictory. Other examples are possible as well. Once the vehicle 202 determines that the updated lane information is reliable, the vehicle 202 may estimate an updated location of the lane 200 using the updated information. Additionally, once the vehicle 202 determines that the updated lane information is reliable, the vehicle 202 may or may not continue to monitor the distance 212 between the vehicle 202 and the neighboring vehicle 208, as described above.

While the vehicle monitored a distance to only one neighboring vehicle in the example implementation described above in connection with FIG. 2, in other example implementations, the vehicle may monitor a distance to more than one vehicle, as described below in connection with FIG. 3.

Figure 3:
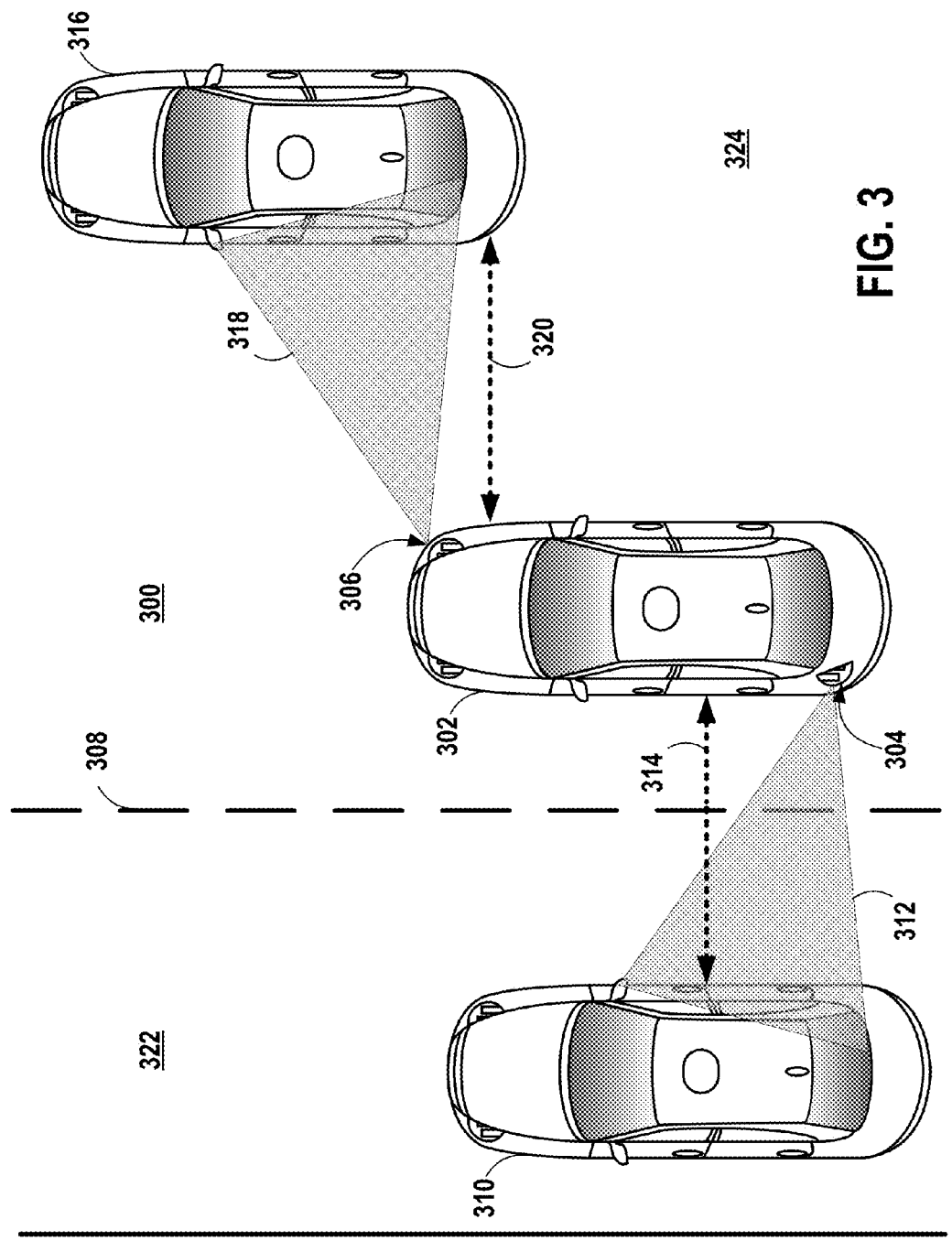
FIG. 3 illustrates an example implementation of the example method, in accordance with an embodiment.

FIG. 3 illustrates an example implementation of the example method, in accordance with an embodiment. As shown in FIG. 3, a vehicle 302 is traveling in a lane 300 on a road. The vehicle 302 includes a computer system (not shown) that is configured to control the vehicle in an autonomous mode. To this end, the vehicle 302 may use lane information, such as lane markings, to estimate a location of the lane 300 on the road.

As shown, the vehicle 302 includes a first sensor 304 and a second sensor 306. Each of the first sensor 304 and the second sensor 306 may include, for example, an image-capture device, a laser rangefinder, and/or a LIDAR unit. Other sensors are possible as well. The vehicle 302 may use the first sensor 304 and the second sensor 306 to obtain lane information about the lane 300. For example, the vehicle 304 may use the first sensor 304 and the second sensor 306 to sense lane markings on the road, as described above.

At some point, the lane information may become unreliable. For example, as shown, while the vehicle 302 may sense the lane marking 308 using the first sensor 304, a lane marking may be missing, such that the second sensor 306 is unable to sense a lane marking. This may be the result of, for example, fading of the lane marking over time. Due to the missing lane marking, the vehicle 302 may have lowered confidence in the lane information and, accordingly, may determine that the lane information has become unreliable.

In response to determining that the lane information has become unreliable, the vehicle 302 may use the first sensor 304 (or, in some embodiments, another sensor (not shown)) to monitor, as shown by the shaded triangle 312, a first neighboring vehicle 310 in a first adjacent lane 322. In particular, the vehicle 302 may monitor a first distance 314 between the vehicle 302 and the first neighboring vehicle 310 in order to maintain the first distance 314 to be at least a predetermined distance. To this end, when the first distance 314 falls below the predetermined distance, the vehicle 302 may move away from the first neighboring vehicle 310 until the first distance 314 is once again greater than the predetermined distance.

Additionally, the vehicle 302 may use the second sensor 306 (or, in some embodiments, another sensor (not shown)) to monitor, as shown by the shaded triangle 318, a second neighboring vehicle 316 in a second adjacent lane 324. In particular, the vehicle 302 may monitor a second distance 320 between the vehicle 302 and the second neighboring vehicle 316 in order to maintain the second distance 320 to be at least the predetermined distance. To this end, when the second distance 320 falls below the predetermined distance, the vehicle 302 may move away from the second neighboring vehicle 316 until the second distance 320 is once again greater than the predetermined distance.

Alternatively or additionally, the vehicle 302 may use the first sensor 304 and the second sensor 306 to monitor the first distance 314 and the second distance 320, respectively, and may control the vehicle 302 to maximize each of the first distance 314 and the second distance 320, while maintaining each of the first distance 314 and the second distance 320 to be greater than the predetermined distance. As a result, the vehicle 302 may remain approximately in the middle between the first neighboring vehicle 310 and the second neighboring vehicle 316, thereby avoiding collisions with either the first neighboring vehicle 310 or the second neighboring vehicle 316.

While the vehicle 302 is monitoring the first distance 314 and the second distance 320, the vehicle 302 may periodically receive updated lane information. At some point, the vehicle 302 may determine that the updated lane information is reliable. For example, ahead on the road the missing lane marking may reappear, such that the second sensor 306 can sense the lane marking. Other examples are possible as well. Once the vehicle 302 determines that the updated lane information is reliable, the vehicle 302 may estimate an updated location of the lane 300 using the updated information. Additionally, once the vehicle 302 determines that the updated lane information is reliable, the vehicle 302 may or may not continue to monitor the first distance 314 and the second distance 320.

In some embodiments, in addition to monitoring a distance between the vehicle and a neighboring vehicle to avoid collisions with the neighboring vehicle, the vehicle may use the distance between the vehicle and the neighboring vehicle to estimate a path of the neighboring vehicle, and may use the estimated path to determine an updated estimated location of the lane.

Figure 4A:
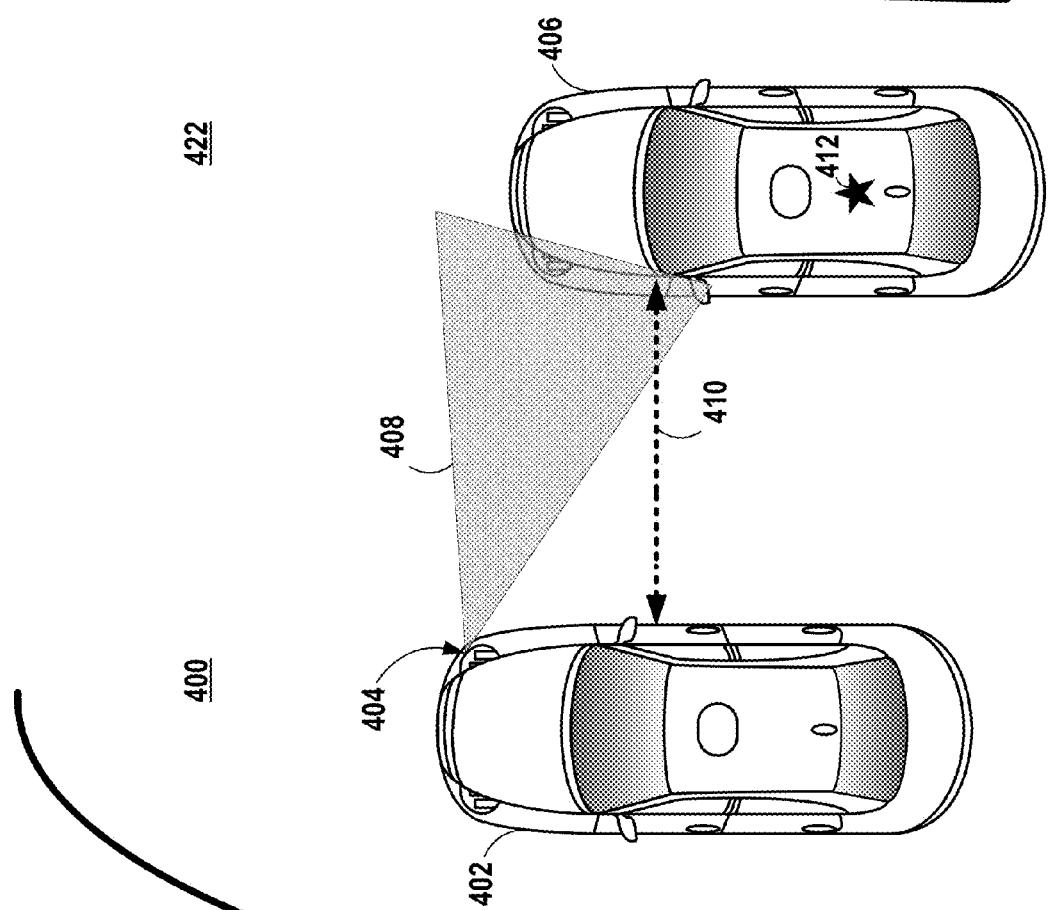
Figure 4C:
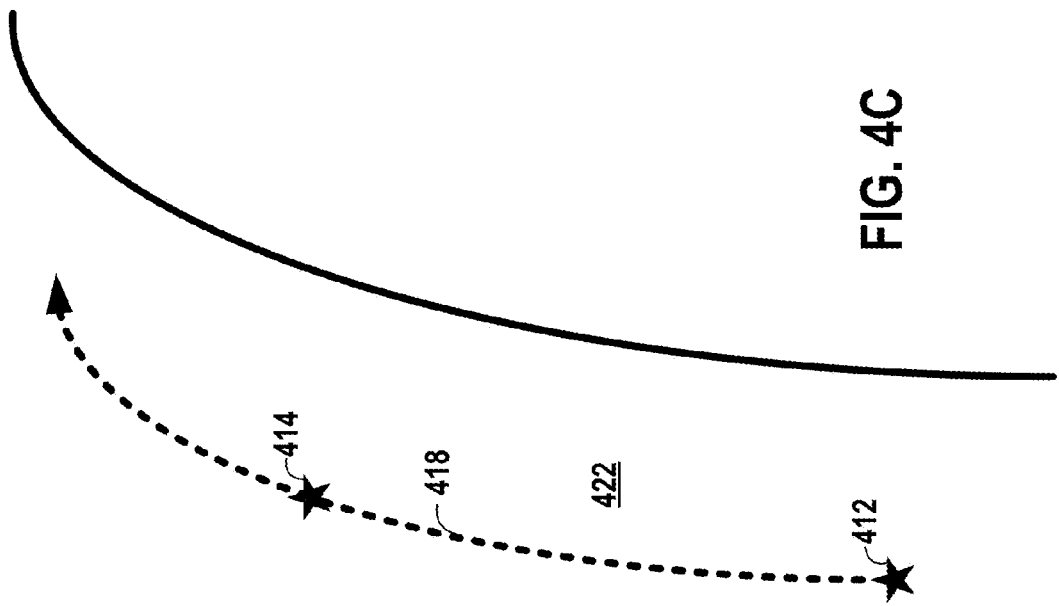
Figure 4C:
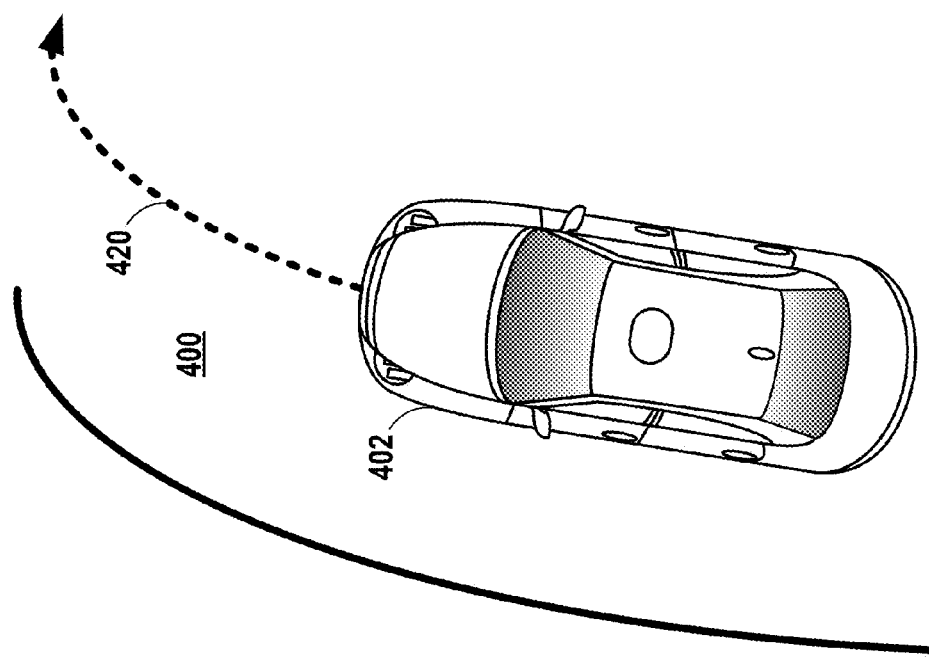

FIGS. 4A-C illustrate an example implementation of the example method, in accordance with an embodiment. As shown in FIG. 4A, a vehicle 402 is traveling in a lane 400 on a road. The vehicle 402 includes a computer system (not shown) that is configured to control the vehicle in an autonomous mode. To this end, the vehicle 402 may use lane information, such as lane markings, to estimate a location of the lane 400 on the road.

As shown, the vehicle 402 includes a sensor 404. The sensor 404 may include, for example, an image-capture device, a laser rangefinder, and/or a LIDAR unit. Other sensors are possible as well. The vehicle 402 may use the sensor 404 to obtain lane information about the lane 400. For example, the vehicle 402 may use the sensor 404 to sense lane markings on the road, as described above.

At some point, the lane information may become unreliable. For example, as shown, a lane marking may be missing, such that the sensor 404 is unable to sense the lane marking. This may be the result of, for example, fading of the lane marking over time. Due to the missing lane marking, the vehicle 402 may have lowered confidence in the lane information and, accordingly, may determine that the lane information has become unreliable.

In response to determining that the lane information has become unreliable, the vehicle 402 may use the sensor 404 (or, in some embodiments, another sensor (not shown)) to monitor, as shown by the shaded triangle 408, a neighboring vehicle 406 in an adjacent lane 422. In particular, the vehicle 402 may monitor a distance first 410 between the vehicle 402 and the neighboring vehicle 406 in order to maintain the first distance 410 to be at least a predetermined distance. Additionally, the vehicle 402 may use the first distance 410 (and, in some embodiments, an orientation of the sensor 404) to determine a first relative position 412 of the neighboring vehicle 406, as indicated by the star.

Thereafter, the vehicle 402 may use the sensor 404 to further monitor a second distance 414 between the vehicle 402 and the neighboring vehicle 406 and may maintain the second distance 414 to be at least the predetermined distance, as shown in FIG. 4B. Additionally, the vehicle 402 may use the second distance 414 (and, in some embodiments, an orientation of the sensor 404) to determine a second relative position 416 of the neighboring vehicle 406, as indicated by the star.

Based on the first relative position 412 and the second relative position 416 of the neighboring vehicle 406, the vehicle 402 may estimate a path 418 for the neighboring vehicle 406, as shown in FIG. 4C (in which the neighboring vehicle 406 is not shown, for clarity). For example, the vehicle 402 may extrapolate from the first relative position 412 and the second relative position 416 (e.g., assuming constant curvature) to estimate the path 418. Other examples are possible as well.

Based on the estimated path 418, the vehicle 402 may determine an updated estimated location of the lane 400. For example, the vehicle 402 may determine that the lane 400 may be centered on a path 420 that is shifted from the estimated path 418 by, for example, a predetermined lane width and may extend by half of the predetermined lane width on either side of the path 420. Other examples are possible as well.

While only first and second distances 410, 414 and first and second relative positions 412, 416 were described above, in other embodiments more distances and relative positions may be determined by the vehicle 402. Additional distances and relative positions may, in some cases, improve the accuracy of the estimated path 418 and, in turn, the updated estimated location of the lane 400.

While the vehicle 402 is monitoring the first and second distances 410, 414 and first and second relative positions 412, 416, the vehicle 402 may periodically receive updated lane information. At some point, the vehicle 402 may determine that the updated lane information is reliable. For example, ahead on the road the missing lane marking may reappear, such that the sensor 404 can sense the lane marking. Other examples are possible as well. Once the vehicle 402 determines that the updated lane information is reliable, the vehicle 402 may estimate an updated location of the lane 400 using the updated information and, in some cases, the estimated path 418. Additionally, once the vehicle 402 determines that the updated lane information is reliable, the vehicle 402 may or may not continue to monitor distances to and relative positions of the neighboring vehicle 406.

In some embodiments, in addition to monitoring a distance to a neighboring vehicle and determining an updated estimated location of the lane, the vehicle may modify a speed of the vehicle in order to allow the neighboring vehicle to pass the vehicle. Once the neighboring vehicle has passed the vehicle, the vehicle may use the neighboring vehicle as a leading vehicle, as described above. The neighboring vehicle may provide more useful lane information as a leading vehicle than as a neighboring vehicle, thereby improving an accuracy of the vehicle's estimated location of the lane.

Figure 5B:
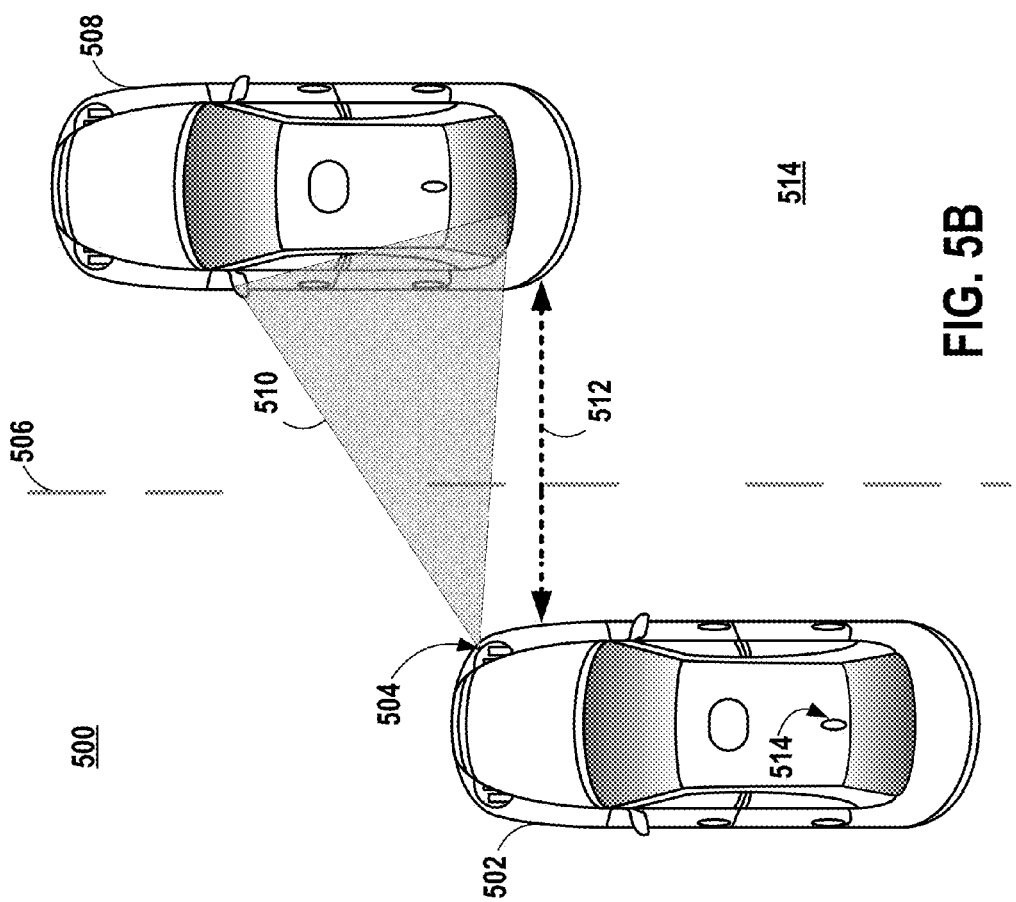

FIGS. 5A-B illustrate an example implementation of the example method, in accordance with an embodiment. As shown in FIG. 5A, a vehicle 502 is traveling in a lane 500 on a road. The vehicle 502 includes a computer system (not shown) that is configured to control the vehicle in an autonomous mode. To this end, the vehicle 502 may use lane information, such as lane markings, to estimate a location of the lane 502 on the road.

As shown, the vehicle 502 includes a first sensor 504. The first sensor 504 may include, for example, an image-capture device, a laser rangefinder, and/or a LIDAR unit. Other sensors are possible as well. The vehicle 502 may use the first sensor 504 to obtain lane information about the lane 500. For example, the vehicle 502 may use the first sensor 504 to sense lane markings on the road, as described above.

At some point, the lane information may become unreliable. For example, as shown, the lane markings 506 may be faded or missing in some places along the road. This may be the result of, for example, fading of the lane marking 506 over time. Due to the faded and missing lane marking 506, the vehicle 502 may have lowered confidence in the lane information and, accordingly, may determine that the lane information has become unreliable.

In response to determining that the lane information has become unreliable, the vehicle 502 may use the first sensor 504 (or, in some embodiments, another sensor (not shown)) to monitor, as shown by the shaded triangle 510, a neighboring vehicle 508 in an adjacent lane 514. In particular, the vehicle 502 may monitor a distance 512 between the vehicle 502 and the neighboring vehicle 08 in order to maintain the distance 512 to be at least a predetermined distance, as described above.

In addition to monitoring the distance 512, the vehicle 502 may additionally monitor a speed of the neighboring vehicle 508. To this end, the vehicle 502 may use a second sensor 514, which may include, for example, a radio detection and ranging (RADAR) unit. Other sensors are possible as well. The vehicle 502 may then modify a speed of the vehicle 502 to be less than the speed of the neighboring vehicle 508, allowing the neighboring vehicle 508 to pass the vehicle 502, as shown in FIG. 5B.

Once the neighboring vehicle 508 has passed the vehicle 502, the neighboring vehicle 508 may become a leading vehicle 508, and the vehicle 502 may estimate a path of the leading vehicle 508, as described above. Once the vehicle 502 has estimated the path of the leading vehicle 508, the vehicle 502 may estimate the location of the lane 500 based on the estimated path. For example, the vehicle 502 may estimate the location of the lane to include the estimated path (e.g., extend by half of a predetermined lane width on either side of the estimated path). Other examples are possible as well.

While the example implementations described above focused on lane information that included only lane markings, it will be understood that other lane information is possible as well, including a geographic location of the vehicle and a predetermined map of the road, as described above. For example, instead of or in addition to determining that lane markings on the road are missing and/or contradictory, the vehicle may determine that the vehicle cannot determine its geographic location (e.g., because the vehicle cannot communicate with a location server), the vehicle may determine that the vehicle does not have a predetermined map (or has only an incomplete predetermined map) of the road, and/or the vehicle may determine that there is no leading vehicle ahead of the vehicle. Other examples are possible as well.

Systems in which example embodiments of the above example methods may be implemented will now be described in greater detail. In general, an example system may be implemented in or may take the form of a vehicle. The vehicle may take a number of forms, including, for example, automobiles, cars, trucks, motorcycles, buses, boats, airplanes, helicopters, lawn mowers, earth movers, snowmobiles, recreational vehicles, amusement park vehicles, farm equipment, construction equipment, trams, golf carts, trains, and trolleys. Other vehicles are possible as well.

Further, another example system may take the form of non-transitory computer-readable medium, which has program instructions stored thereon that are executable by at least one processor to provide the functionality described herein. An example system may also take the form of a vehicle or a subsystem of a vehicle that includes such a non-transitory computer-readable medium having such program instructions stored thereon.

Figure 6:
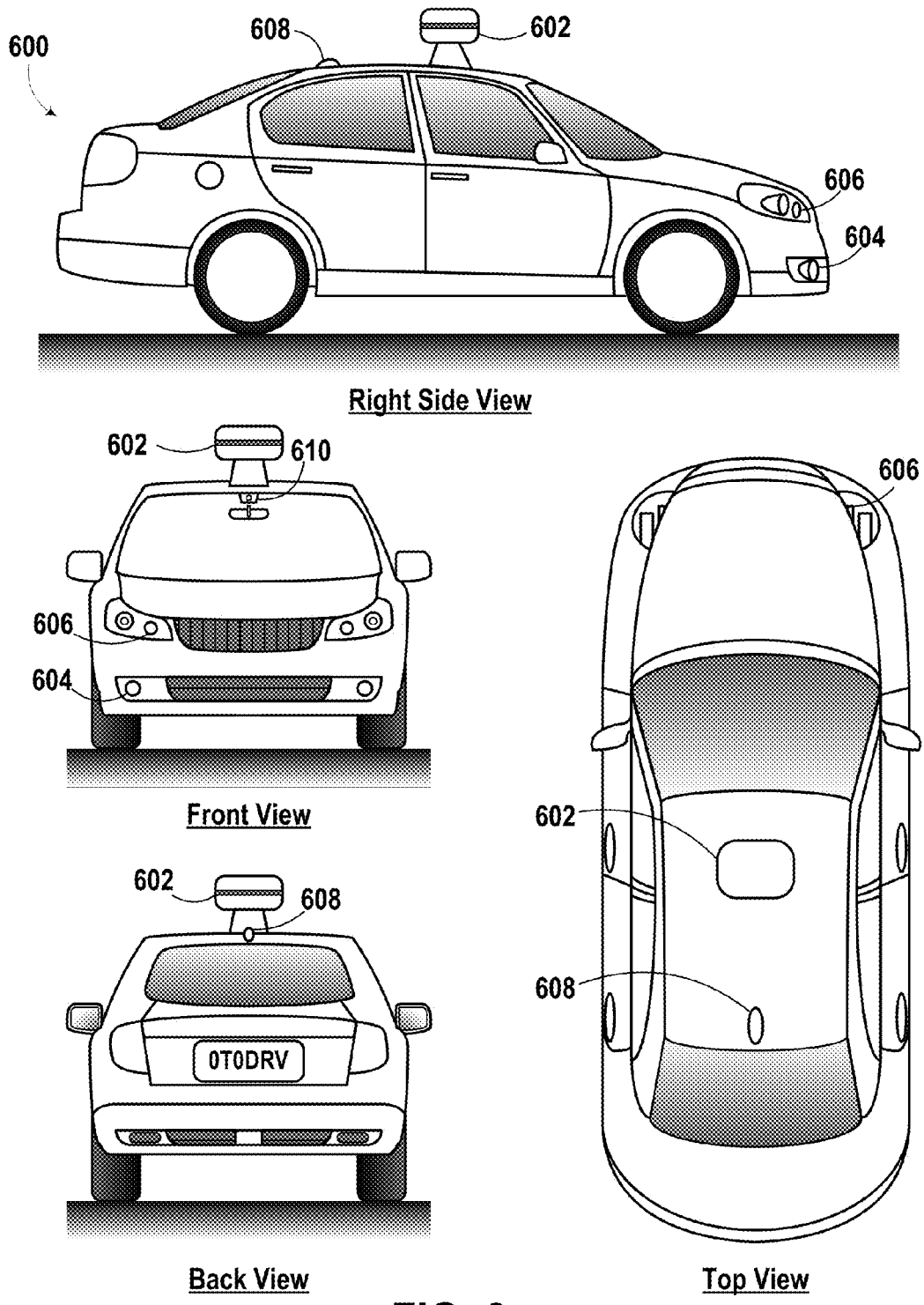
FIG. 6 illustrates an example vehicle, in accordance with an embodiment.

FIG. 6 illustrates an example vehicle 600, in accordance with an embodiment. In particular, FIG. 6 shows a Right Side View, Front View, Back View, and Top View of the vehicle 600. Although vehicle 600 is illustrated in FIG. 6 as a car, other embodiments are possible. For instance, the vehicle 600 could represent a truck, a van, a semi-trailer truck, a motorcycle, a golf cart, an off-road vehicle, or a farm vehicle, among other examples. As shown, the vehicle 600 includes a first sensor unit 602, a second sensor unit 604, a third sensor unit 606, a wireless communication system 608, and an image-capture device 610.

Each of the first, second, and third sensor units 602-606 may include any combination of global positioning system sensors, inertial measurement units, RADAR units, laser rangefinders, LIDAR units, image-capture devices, and acoustic sensors. Other types of sensors are possible as well.

While the first, second, and third sensor units 602-606 are shown to be mounted in particular locations on the vehicle 600, in some embodiments the sensor unit 602 may be mounted elsewhere on the vehicle 600, either inside or outside the vehicle 600. Further, while only three sensor units are shown, in some embodiments more or fewer sensor units may be included in the vehicle 600.

In some embodiments, one or more of the first, second, and third sensor units 602-606 may include one or more movable mounts on which the sensors may be movably mounted. The movable mount may include, for example, a rotating platform. Sensors mounted on the rotating platform could be rotated so that the sensors may obtain information from each direction around the vehicle 600. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some embodiments, one or more of the first, second, and third sensor units 602-606 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 608 may be any system configured to wirelessly couple to one or more other vehicles, sensors, or other entities, either directly or via a communication network. To this end, the wireless communication system 608 may include an antenna and a chipset for communicating with the other vehicles, sensors, or other entities either directly or over an air interface. The chipset or wireless communication system 608 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 608 may take other forms as well.

While the wireless communication system 608 is shown to be positioned on a roof of the vehicle 600, in other embodiments the wireless communication system 608 could be located, fully or in part, elsewhere.

The image-capture device 610 may be any device (e.g., a still camera, a video camera, etc.) configured to capture images of the environment in which the vehicle 600 is located. To this end, the image-capture device 610 may be configured to detect visible light, or may be configured to detect light from other portions of the spectrum, such as infrared or ultraviolet light. Other types of image-capture devices are possible as well. The image-capture device 610 may be a two-dimensional detector, or may have a three-dimensional spatial range. In some embodiments, the image-capture device 610 may be, for example, a range detector configured to generate a two-dimensional image indicating a distance from the image-capture device 610 to a number of points in the environment. To this end, the image-capture device 610 may use one or more range detecting techniques. For example, the image-capture device 610 may use a structured light technique in which the vehicle 600 illuminates an object in the environment with a predetermined light pattern, such as a grid or checkerboard pattern and uses the image-capture device 610 to detect a reflection of the predetermined light pattern off the object. Based on distortions in the reflected light pattern, the vehicle 600 may determine the distance to the points on the object. The predetermined light pattern may comprise infrared light, or light of another wavelength. As another example, the image-capture device 610 may use a laser scanning technique in which the vehicle 600 emits a laser and scans across a number of points on an object in the environment. While scanning the object, the vehicle 600 uses the image-capture device 610 to detect a reflection of the laser off the object for each point. Based on a length of time it takes the laser to reflect off the object at each point, the vehicle 600 may determine the distance to the points on the object. As yet another example, the image-capture device 610 may use a time-of-flight technique in which the vehicle 600 emits a light pulse and uses the image-capture device 610 to detect a reflection of the light pulse off an object at a number of points on the object. In particular, the image-capture device 610 may include a number of pixels, and each pixel may detect the reflection of the light pulse from a point on the object. Based on a length of time it takes the light pulse to reflect off the object at each point, the vehicle 600 may determine the distance to the points on the object. The light pulse may be a laser pulse. Other range detecting techniques are possible as well, including stereo triangulation, sheet-of-light triangulation, interferometry, and coded aperture techniques, among others. The image-capture device 610 may take other forms as well.

In some embodiments, the image-capture device 610 may include a movable mount and/or an actuator, as described above, that are configured to adjust the position and/or orientation of the image-capture device 610 and/or the movable mount.

While the image-capture device 610 is shown to be mounted inside a front windshield of the vehicle 600, in other embodiments the image-capture device 610 may be mounted elsewhere on the vehicle 600, either inside or outside the vehicle 600.

The vehicle 600 may include one or more other components in addition to or instead of those shown.

Figure 7:
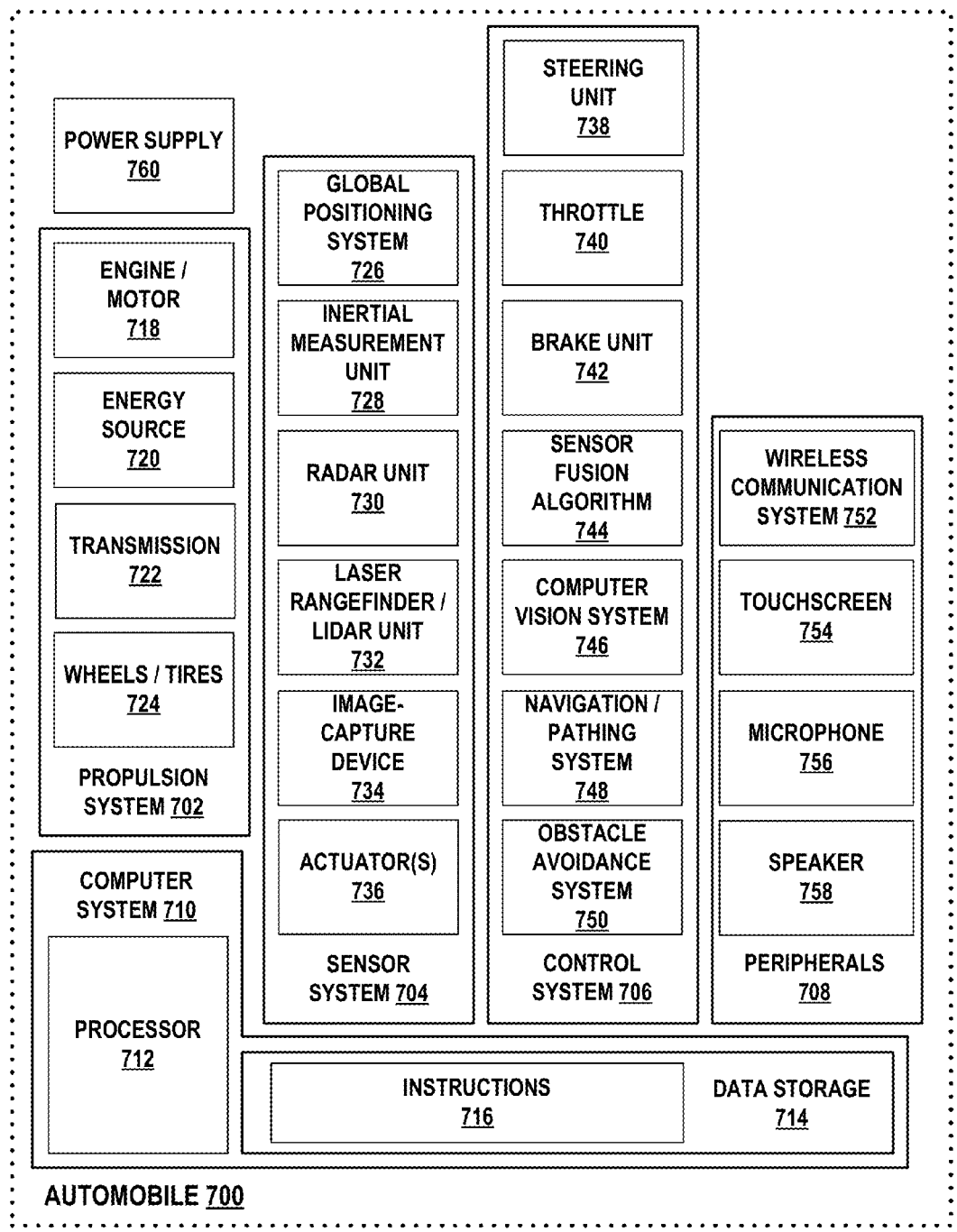
FIG. 7 is a simplified block diagram of an example vehicle, in accordance with an embodiment.

FIG. 7 is a simplified block diagram of an example vehicle 700, in accordance with an embodiment. The vehicle 700 may, for example, be similar to the vehicle 600 described above in connection with FIG. 6. The vehicle 700 may take other forms as well.

As shown, the vehicle 700 includes a propulsion system 702, a sensor system 704, a control system 706, peripherals 708, and a computer system 710 including a processor 712, data storage 714, and instructions 716. In other embodiments, the vehicle 700 may include more, fewer, or different systems, and each system may include more, fewer, or different components. Additionally, the systems and components shown may be combined or divided in any number of ways.

The propulsion system 702 may be configured to provide powered motion for the vehicle 700. As shown, the propulsion system 702 includes an engine/motor 718, an energy source 720, a transmission 722, and wheels/tires 724.

The engine/motor 718 may be or include any combination of an internal combustion engine, an electric motor, a steam engine, and a Stirling engine. Other motors and engines are possible as well. In some embodiments, the propulsion system 702 could include multiple types of engines and/or motors. For instance, a gas-electric hybrid car could include a gasoline engine and an electric motor. Other examples are possible.

The energy source 720 may be a source of energy that powers the engine/motor 718 in full or in part. That is, the engine/motor 718 may be configured to convert the energy source 720 into mechanical energy. Examples of energy sources 720 include gasoline, diesel, propane, other compressed gas-based fuels, ethanol, solar panels, batteries, and other sources of electrical power. The energy source(s) 720 could additionally or alternatively include any combination of fuel tanks, batteries, capacitors, and/or flywheels. In some embodiments, the energy source 720 may provide energy for other systems of the vehicle 700 as well.

The transmission 722 may be configured to transmit mechanical power from the engine/motor 718 to the wheels/tires 724. To this end, the transmission 722 may include a gearbox, clutch, differential, drive shafts, and/or other elements. In embodiments where the transmission 722 includes drive shafts, the drive shafts could include one or more axles that are configured to be coupled to the wheels/tires 724.

The wheels/tires 724 of vehicle 700 could be configured in various formats, including a unicycle, bicycle/motorcycle, tricycle, or car/truck four-wheel format. Other wheel/tire formats are possible as well, such as those including six or more wheels. In any case, the wheels/tires 724 of vehicle 700 may be configured to rotate differentially with respect to other wheels/tires 724. In some embodiments, the wheels/tires 724 may include at least one wheel that is fixedly attached to the transmission 722 and at least one tire coupled to a rim of the wheel that could make contact with the driving surface. The wheels/tires 724 may include any combination of metal and rubber, or combination of other materials.

The propulsion system 702 may additionally or alternatively include components other than those shown.

The sensor system 704 may include a number of sensors configured to sense information about an environment in which the vehicle 700 is located, as well as one or more actuators 736 configured to modify a position and/or orientation of the sensors. As shown, the sensors of the sensor system include a Global Positioning System (GPS) 726, an inertial measurement unit (IMU) 728, a RADAR unit 730, a laser rangefinder and/or LIDAR unit 732, and an image-capture device 734. The sensor system 704 may include additional sensors as well, including, for example, sensors that monitor internal systems of the vehicle 700 (e.g., an $O_2$ monitor, a fuel gauge, an engine oil temperature, etc.). Other sensors are possible as well.

The GPS 726 may be any sensor configured to estimate a geographic location of the vehicle 700. To this end, the GPS 726 may include a transceiver configured to estimate a position of the vehicle 700 with respect to the Earth. The GPS 726 may take other forms as well.

The IMU 728 may be any combination of sensors configured to sense position and orientation changes of the vehicle 700 based on inertial acceleration. In some embodiments, the combination of sensors may include, for example, accelerometers and gyroscopes. Other combinations of sensors are possible as well.

The RADAR 730 unit may be any sensor configured to sense objects in the environment in which the vehicle 700 is located using radio signals. In some embodiments, in addition to sensing the objects, the RADAR unit 730 may additionally be configured to sense the speed and/or heading of the objects.

Similarly, the laser rangefinder or LIDAR unit 732 may be any sensor configured to sense objects in the environment in which the vehicle 700 is located using lasers. In particular, the laser rangefinder or LIDAR unit 732 may include a laser source and/or laser scanner configured to emit a laser and a detector configured to detect reflections of the laser. The laser rangefinder or LIDAR 732 may be configured to operate in a coherent (e.g., using heterodyne detection) or an incoherent detection mode.

The image-capture device 734 may be any device (e.g., a still camera, a video camera, etc.) configured to capture images of the environment in which the vehicle 700 is located. To this end, the image-capture device 734 may take any of the forms described above in connection with the image-capture device 610 in FIG. 6.

The sensor system 704 may additionally or alternatively include components other than those shown.

The control system 706 may be configured to control operation of the vehicle 700 and its components. To this end, the control system 706 may include a steering unit 738, a throttle 740, a brake unit 742, a sensor fusion algorithm 744, a computer vision system 746, a navigation or pathing system 748, and an obstacle avoidance system 750.

The steering unit 738 may be any combination of mechanisms configured to adjust the heading of vehicle 700.

The throttle 740 may be any combination of mechanisms configured to control the operating speed of the engine/motor 718 and, in turn, the speed of the vehicle 700.

The brake unit 742 may be any combination of mechanisms configured to decelerate the vehicle 700. For example, the brake unit 742 may use friction to slow the wheels/tires 724. As another example, the brake unit 742 may convert the kinetic energy of the wheels/tires 724 to electric current. The brake unit 742 may take other forms as well.

The sensor fusion algorithm 744 may be an algorithm (or a computer program product storing an algorithm) configured to accept data from the sensor system 704 as an input. The data may include, for example, data representing information sensed at the sensors of the sensor system 704. The sensor fusion algorithm 744 may include, for example, a Kalman filter, a Bayesian network, or another algorithm. The sensor fusion algorithm 744 may further be configured to provide various assessments based on the data from the sensor system 704, including, for example, evaluations of individual objects and/or features in the environment in which the vehicle 700 is located, evaluations of particular situations, and/or evaluations of possible impacts based on particular situations. Other assessments are possible as well.

The computer vision system 746 may be any system configured to process and analyze images captured by the image-capture device 734 in order to identify objects and/or features in the environment in which the vehicle 700 is located, including, for example, traffic signals and obstacles. To this end, the computer vision system 746 may use an object recognition algorithm, a Structure from Motion (SFM) algorithm, video tracking, or other computer vision techniques. In some embodiments, the computer vision system 746 may additionally be configured to map the environment, track objects, estimate the speed of objects, etc.

The navigation and pathing system 748 may be any system configured to determine a driving path for the vehicle 700.

The navigation and pathing system 748 may additionally be configured to update the driving path dynamically while the vehicle 700 is in operation. In some embodiments, the navigation and pathing system 748 may be configured to incorporate data from the sensor fusion algorithm 744, the GPS 726, and one or more predetermined maps so as to determine the driving path for vehicle 700.

The obstacle avoidance system 750 may be any system configured to identify, evaluate, and avoid or otherwise negotiate obstacles in the environment in which the vehicle 700 is located.

The control system 706 may additionally or alternatively include components other than those shown.

Peripherals 708 may be configured to allow the vehicle 700 to interact with external sensors, other vehicles, and/or a user. To this end, the peripherals 708 may include, for example, a wireless communication system 752, a touchscreen 754, a microphone 756, and/or a speaker 758.

The wireless communication system 752 may take any of the forms described above.

The touchscreen 754 may be used by a user to input commands to the vehicle 700. To this end, the touchscreen 754 may be configured to sense at least one of a position and a movement of a user's finger via capacitive sensing, resistance sensing, or a surface acoustic wave process, among other possibilities. The touchscreen 754 may be capable of sensing finger movement in a direction parallel or planar to the touchscreen surface, in a direction normal to the touchscreen surface, or both, and may also be capable of sensing a level of pressure applied to the touchscreen surface. The touchscreen 754 may be formed of one or more translucent or transparent insulating layers and one or more translucent or transparent conducting layers. The touchscreen 754 may take other forms as well.

The microphone 756 may be configured to receive audio (e.g., a voice command or other audio input) from a user of the vehicle 700. Similarly, the speakers 758 may be configured to output audio to the user of the vehicle 700.

The peripherals 708 may additionally or alternatively include components other than those shown.

The computer system 710 may be configured to transmit data to and receive data from one or more of the propulsion system 702, the sensor system 704, the control system 706, and the peripherals 708. To this end, the computer system 710 may be communicatively linked to one or more of the propulsion system 702, the sensor system 704, the control system 706, and the peripherals 708 by a system bus, network, and/or other connection mechanism (not shown).

The computer system 710 may be further configured to interact with and control one or more components of the propulsion system 702, the sensor system 704, the control system 706, and/or the peripherals 708. For example, the computer system 710 may be configured to control operation of the transmission 722 to improve fuel efficiency. As another example, the computer system 710 may be configured to cause the image-capture device 734 to capture images of the environment. As yet another example, the computer system 710 may be configured to store and execute instructions corresponding to the sensor fusion algorithm 744. As still another example, the computer system 710 may be configured to store and execute instructions for displaying a display on the touchscreen 754. Other examples are possible as well.

As shown, the computer system 710 includes the processor 712 and data storage 714. The processor 712 may comprise one or more general-purpose processors and/or one or more special-purpose processors. To the extent the processor 712 includes more than one processor, such processors could work separately or in combination. Data storage 714, in turn, may comprise one or more volatile and/or one or more non-volatile storage components, such as optical, magnetic, and/or organic storage, and data storage 714 may be integrated in whole or in part with the processor 712.

In some embodiments, data storage 714 may contain instructions 716 (e.g., program logic) executable by the processor 712 to execute various vehicle functions, including those described above in connection with FIGS. 1-5B. Data storage 714 may contain additional instructions as well, including instructions to transmit data to, receive data from, interact with, and/or control one or more of the propulsion system 702, the sensor system 704, the control system 706, and the peripherals 708.

The computer system 702 may additionally or alternatively include components other than those shown.

As shown, the vehicle 700 further includes a power supply 760, which may be configured to provide power to some or all of the components of the vehicle 700. To this end, the power supply 760 may include, for example, a rechargeable lithium-ion or lead-acid battery. In some embodiments, one or more banks of batteries could be configured to provide electrical power. Other power supply materials and configurations are possible as well. In some embodiments, the power supply 760 and energy source 720 may be implemented together, as in some all-electric cars.

In some embodiments, one or more of the propulsion system 702, the sensor system 704, the control system 706, and the peripherals 708 could be configured to work in an interconnected fashion with other components within and/or outside their respective systems.

Further, the vehicle 700 may include one or more elements in addition to or instead of those shown. For example, the vehicle 700 may include one or more additional interfaces and/or power supplies. Other additional components are possible as well. In such embodiments, data storage 714 may further include instructions executable by the processor 712 to control and/or communicate with the additional components.

Still further, while each of the components and systems are shown to be integrated in the vehicle 700, in some embodiments, one or more components or systems may be removably mounted on or otherwise connected (mechanically or electrically) to the vehicle 700 using wired or wireless connections.

The vehicle 700 may take other forms as well.

Figure 8:
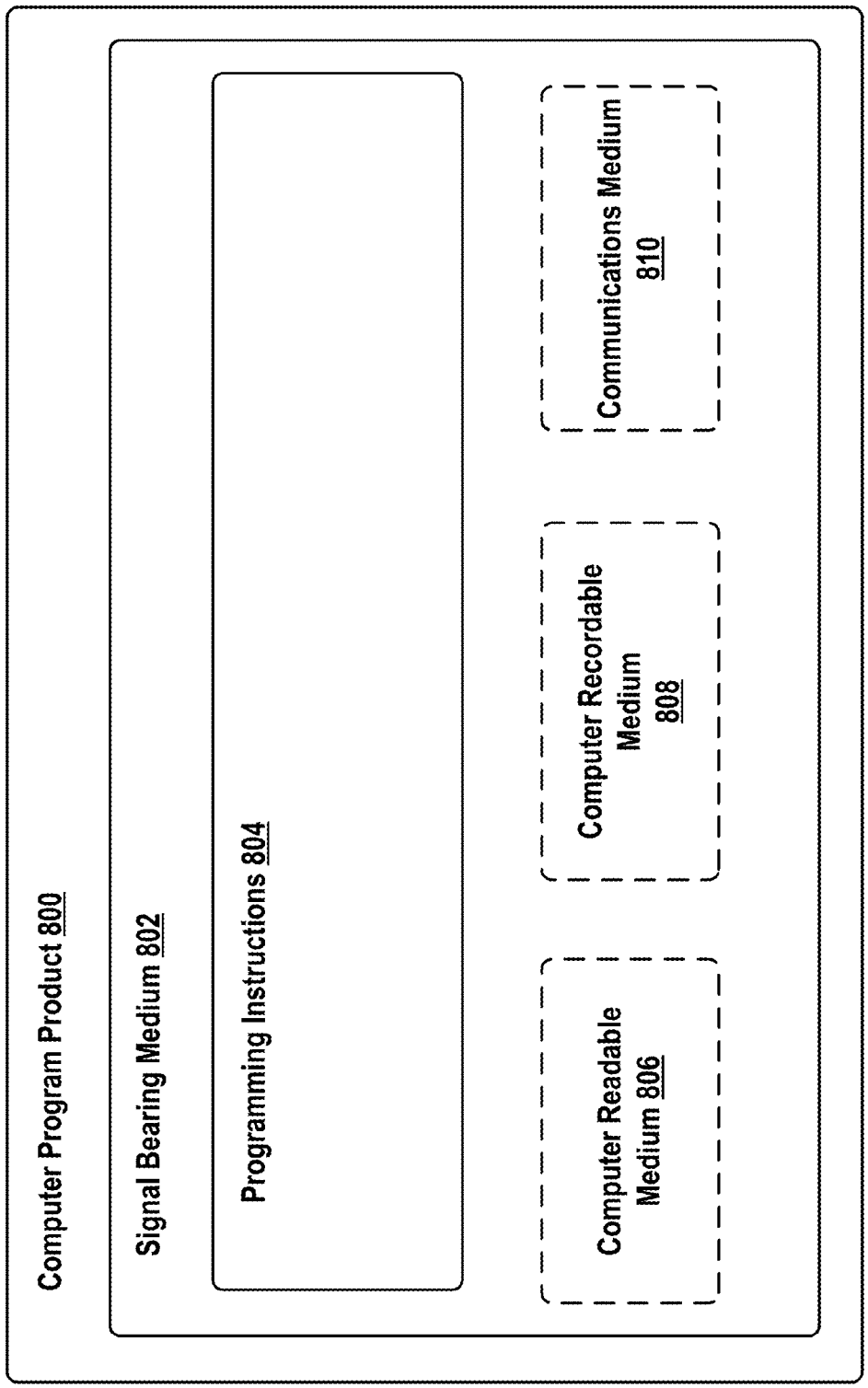
FIG. 8 is a simplified block diagram of an example computer program product, in accordance with an embodiment.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product 800 that includes a computer program for executing a computer process on a computing device, arranged according to at least some embodiments presented herein.

In one embodiment, the example computer program product 800 is provided using a signal bearing medium 802. The signal bearing medium 802 may include one or more programming instructions 804 that, when executed by one or more processors, may provide functionality or portions of the functionality described above with respect to FIGS. 1-5B.

In some embodiments, the signal bearing medium 802 may encompass a computer-readable medium 806, such as, but not limited to, a hard disk drive, a Compact Disc (CD), a Digital Video Disk (DVD), a digital tape, memory, etc. Further, in some embodiments the signal bearing medium 802 may encompass a computer recordable medium 808, such as, but not limited to, memory, read/write (R/W) CDs, R/W DVDs, etc. Still further, in some embodiments the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing device (e.g., the computer system 710 of FIG. 7) may be configured to provide various operations, functions, or actions in response to the programming instructions 804 being conveyed to the computing device by one or more of the computer readable medium 806, the computer recordable medium 808, and/or the communications medium 810.

The non-transitory computer readable medium may also be distributed among multiple data storage elements, which could be remotely located from each other.

In some embodiments, the computing device that executes some or all of the programming instructions 804 could be a vehicle, such as the vehicle 700 illustrated in FIG. 7. Other computing devices are possible as well.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
obtaining, by a computer system, lane information that provides an estimated location of a lane of a road on which a vehicle is traveling, wherein the computer system is configured to control the vehicle in an autonomous mode;
determining, by the computer system, that the lane information has become unavailable or unreliable; and
in response to determining that the lane information has become unavailable or unreliable, the computer system:
using at least one sensor to monitor at least one neighboring vehicle, and
controlling the vehicle to maintain a distance between the vehicle and the at least one neighboring vehicle to be at least a predetermined minimum distance.

2. The method of claim 1, wherein the lane information is based on at least one of a lane marking on the road, a geographic location of the vehicle, and a predetermined map of the road.

3. The method of claim 1, wherein determining that the lane information has become unavailable or unreliable comprises detecting that a confidence of the lane information is less than a predetermined threshold.

4. The method of claim 1, wherein determining that the lane information has become unavailable or unreliable comprises detecting that a confidence of the lane information is less than a predetermined threshold for at least a predetermined amount of time.

5. The method of claim 1, wherein:
the at least one neighboring vehicle comprises a first neighboring vehicle and a second neighboring vehicle; and
maintaining the distance between the vehicle and the at least one neighboring vehicle to be at least the predetermined minimum distance comprises maximizing both a first distance between the vehicle and the first neighboring vehicle and a second distance between the vehicle and the second neighboring vehicle, while maintaining each of the first distance and the second distance to be greater than the predetermined minimum distance.

6. The method of claim 1, wherein using the at least one sensor to monitor the at least one neighboring vehicle comprises using the at least one sensor to monitor at least a first distance and a second distance to the at least one neighboring vehicle, the method further comprising:
based on the first distance and the second distance, determining a first relative position and a second relative position of the at least one neighboring vehicle;
based on the first relative position and the second relative position, estimating a path for the at least one neighboring vehicle; and
based on the estimated path, determining an updated estimated location of the lane.

7. The method of claim 1, further comprising:
using a speed sensor to monitor a speed of the at least one neighboring vehicle; and
modifying a speed of the vehicle to be less than the speed of the at least one neighboring vehicle.

8. The method of claim 1, further comprising:
periodically obtaining, by a computer system, updated lane information that provides an updated estimated location of the lane;
determining, by the computer system, that the updated lane information has become reliable; and
in response to determining that the updated lane information has become reliable, ceasing to control the vehicle to maintain the distance between the vehicle and the at least one neighboring vehicle to be at least the predetermined minimum distance.

9. The method of claim 8, wherein determining that the updated lane information has become reliable comprises detecting that a confidence of the updated lane information is greater than a predetermined threshold.

10. A vehicle configured to operate in an autonomous mode, the vehicle comprising:
at least one sensor;
at least one processor; and
data storage comprising a predetermined minimum distance and instructions executable by the at least one processor to:
obtain lane information that provides an estimated location of a lane of a road on which the vehicle is traveling;
determine that the lane information has become unavailable or unreliable; and
in response to determining that the lane information has become unavailable or unreliable:
use the at least one sensor to monitor at least one neighboring vehicle, and
control the vehicle to maintain a distance between the vehicle and the at least one neighboring vehicle to be at least a predetermined minimum distance.

11. The vehicle of claim 10, wherein the at least one sensor comprises a laser.

12. The vehicle of claim 10, wherein the at least one sensor comprises at least one of a lane marking sensor configured to sense a lane marking on the road and a location sensor configured to sense a geographic location of the vehicle.

13. The vehicle of claim 12, wherein the lane information is based on at least one of the lane marking on the road and the geographic location of the vehicle.

14. The vehicle of claim 10, wherein the data storage further comprises a predetermined map of the road.

15. The vehicle of claim 14, wherein the lane information is based on the predetermined map.

16. The vehicle of claim 10, further comprising a speed sensor configured to sense a speed of the at least one neighboring vehicle.

17. The vehicle of claim 10, further comprising a throttle configured to modify a speed of the vehicle to be less than the speed of the at least one neighboring vehicle.

18. A non-transitory computer-readable medium having stored therein instructions executable by a computing device to cause the computing device to perform functions comprising:
obtaining lane information that provides an estimated location of a lane of a road on which a vehicle is traveling;
determining that the lane information has become unavailable or unreliable; and
in response to determining that the lane information has become unavailable or unreliable:
using at least one sensor to monitor at least one neighboring vehicle, and
controlling the vehicle to maintain a distance between the vehicle and the at least one neighboring vehicle to be at least a predetermined minimum distance.

19. The non-transitory computer-readable medium of claim 18, wherein using the at least one sensor to monitor the at least one neighboring vehicle comprises using the at least one sensor to monitor at least a first distance and a second distance to the at least one neighboring vehicle, the method further comprising:
based on the first distance and the second distance, determining a first relative position and a second relative position of the at least one neighboring vehicle;
based on the first relative position and the second relative position, estimating a path for the at least one neighboring vehicle; and
based on the estimated path, determining an updated estimated location of the lane.

20. The non-transitory computer-readable medium of claim 17, wherein the functions further comprise:
periodically obtaining updated lane information that provides an updated estimated location of the lane;
determining that the updated lane information has become reliable; and
in response to determining that the updated lane information has become reliable, ceasing to control the vehicle to maintain the distance between the vehicle and the at least one neighboring vehicle to be at least the predetermined minimum distance.

* * * * *